US008794708B2

(12) United States Patent
Besnard et al.

(10) Patent No.: US 8,794,708 B2
(45) Date of Patent: Aug. 5, 2014

(54) MOTOR VEHICLE SEAT UPHOLSTERY FORMATION

(75) Inventors: Nicolas Besnard, Sermaises (FR); Régis Couedro, Etampes (FR); Fabrice Etienne, Belfort (FR); Etienne Poulet, Saint Bresson (FR)

(73) Assignee: Faurecia Sieges d'Autmobile, Nanterre (FR)

( * ) Notice: Subject to any disclaimer, the term of this patent is extended or adjusted under 35 U.S.C. 154(b) by 498 days.

(21) Appl. No.: 13/055,510

(22) PCT Filed: Jul. 17, 2009

(86) PCT No.: PCT/FR2009/051434
§ 371 (c)(1),
(2), (4) Date: Apr. 11, 2011

(87) PCT Pub. No.: WO2010/010281
PCT Pub. Date: Jan. 28, 2010

(65) Prior Publication Data
US 2011/0187176 A1 Aug. 4, 2011

(30) Foreign Application Priority Data

Jul. 24, 2008 (FR) .................................. 08 55067
Mar. 16, 2009 (FR) .................................. 09 51649

(51) Int. Cl.
*A47C 7/02* (2006.01)
(52) U.S. Cl.
USPC .............. 297/452.58; 297/218.2; 297/452.6; 29/91.1; 29/91.5; 29/428

(58) Field of Classification Search
USPC .................. 297/452.58, 452.6, 452.62, 218.2
See application file for complete search history.

(56) References Cited

U.S. PATENT DOCUMENTS

| 4,060,280 A | * | 11/1977 | Van Loo .................. 297/452.61 |
| 4,247,347 A | * | 1/1981 | Lischer et al. .................. 156/79 |
| 4,247,348 A | * | 1/1981 | Lischer .......................... 156/79 |
| 4,264,386 A | * | 4/1981 | Sears et al. ...................... 156/79 |
| 4,287,143 A | * | 9/1981 | Sears et al. .................... 264/46.8 |
| 4,288,499 A | * | 9/1981 | Kielbania, Jr. ................ 428/518 |
| 4,470,857 A | * | 9/1984 | Casalou .......................... 156/66 |
| 4,772,070 A | * | 9/1988 | Leto et al. ................. 297/228.12 |

(Continued)

FOREIGN PATENT DOCUMENTS

| CN | 1225058 | 8/1999 |
| CN | 1723312 | 1/2006 |

(Continued)

OTHER PUBLICATIONS

International Preliminary Report on Patentability and Written Opinion issued in PCT/FR2009/051434 on Mar. 1, 2011.

*Primary Examiner* — David E Allred
(74) *Attorney, Agent, or Firm* — Vedder Price PC

(57) ABSTRACT

The invention relates to the upholstery of a seat element for a motor vehicle and to the method of creating it, in which method a foam support block is produced to fit a frame element; a cover element is created by cold-forming a foam sprayed onto a polypropylene substrate and attached on the reverse side of a textile material in the form of a skin or synthetic material to define the visible shape of the seat element; and the cover element is attached to the support block.

6 Claims, 5 Drawing Sheets

(56) References Cited

U.S. PATENT DOCUMENTS

| | | | |
|---|---|---|---|
| 4,792,111 A | 12/1988 | Taguchi | |
| 4,795,517 A * | 1/1989 | Elliott et al. | 156/221 |
| 4,829,644 A * | 5/1989 | Kondo et al. | 29/91.1 |
| 4,831,697 A * | 5/1989 | Urai | 29/91.1 |
| 4,883,320 A * | 11/1989 | Izumida et al. | 297/452.56 |
| 4,892,891 A * | 1/1990 | Close | 521/69 |
| 4,894,277 A * | 1/1990 | Akasaki | 428/198 |
| 4,927,209 A * | 5/1990 | Maruyama | 297/180.12 |
| 5,283,918 A * | 2/1994 | Weingartner et al. | 297/452.21 |
| 5,477,572 A * | 12/1995 | Weingartner et al. | 297/452.48 |
| 5,632,053 A * | 5/1997 | Weingartner et al. | 5/655.9 |
| 5,830,548 A * | 11/1998 | Andersen et al. | 428/36.4 |
| 6,471,908 B1 * | 10/2002 | Beckmann | 264/515 |
| 6,842,950 B2 * | 1/2005 | Fleuchaus et al. | 24/442 |
| 6,892,433 B2 * | 5/2005 | Barry et al. | 29/469 |
| 7,056,457 B2 * | 6/2006 | Senoo | 264/46.4 |
| 7,481,489 B2 * | 1/2009 | Demick | 297/218.1 |
| 7,487,575 B2 * | 2/2009 | Smith | 24/297 |
| 7,823,980 B2 * | 11/2010 | Niwa et al. | 297/452.61 |
| 7,837,263 B2 * | 11/2010 | Booth et al. | 297/218.1 |
| 7,946,649 B2 * | 5/2011 | Galbreath et al. | 297/218.1 |
| 8,099,837 B2 * | 1/2012 | Santin et al. | 24/297 |
| 8,191,971 B2 * | 6/2012 | Lovasz | 297/452.6 |
| 8,522,406 B2 * | 9/2013 | Voigt | 24/306 |
| 8,647,544 B2 * | 2/2014 | Burch | 264/46.6 |
| 2002/0101109 A1 * | 8/2002 | Stiller et al. | 297/452.6 |
| 2003/0215601 A1 | 11/2003 | Pedde | |
| 2003/0228455 A1 * | 12/2003 | Panczyk et al. | 428/304.4 |
| 2005/0006944 A1 * | 1/2005 | Ali et al. | 297/452.6 |
| 2006/0141260 A1 * | 6/2006 | Haque et al. | 428/412 |
| 2008/0224509 A1 * | 9/2008 | Demick | 297/218.2 |
| 2008/0258523 A1 * | 10/2008 | Santin et al. | 297/218.2 |
| 2008/0309143 A1 * | 12/2008 | Booth et al. | 297/452.56 |
| 2009/0075084 A1 * | 3/2009 | Kochi et al. | 428/409 |
| 2009/0085384 A1 * | 4/2009 | Galbreath et al. | 297/218.1 |
| 2009/0295215 A1 * | 12/2009 | Galbreath et al. | 297/452.6 |
| 2009/0302664 A1 * | 12/2009 | Galbreath et al. | 297/452.48 |
| 2010/0041780 A1 * | 2/2010 | Friedrich et al. | 521/107 |

FOREIGN PATENT DOCUMENTS

| | | |
|---|---|---|
| EP | 0387230 A1 | 9/1990 |
| EP | 0396305 A2 | 11/1990 |
| GB | 2006667 A | 5/1979 |
| WO | 9114566 A1 | 10/1991 |

* cited by examiner

MOTOR VEHICLE SEAT UPHOLSTERY FORMATION

FIELD OF THE INVENTION

The present invention generally relates to motor vehicle seats and, more specifically, to the forming of upholstery for a seat element (seat bottom piece, backrest, headrest, armrest).

DISCUSSION OF PRIOR ART

Motor vehicle seat upholstery generally is in the form of a padding covered with a cover. The padding is a foam block, generally molded according to the final shape desired for the seat element. This block is assembled to a seat frame and is then covered with a textile cover (woven or not), made of skin or synthetic matter. The flexibility of the cover enables it to adapt to the shape given to the padding, in particular to the possible style features defined by the padding. In certain cases, the cover comprises, on its inner (non visible) surface, a thin layer of foam (the assembly then has a uniform thickness approximately ranging from 1 to 5 millimeters).

A padding is thus dedicated to a seat, since it must both fit the frame and give the element its final shape, the flexible cover only covering the padding.

It would be desirable to be able to standardize foam blocks forming a seat element for different style features.

It would also be desirable to be able to form such an element with areas having different densities and/or hardnesses.

SUMMARY OF THE INVENTION

An object of the present invention is to overcome all or part of the disadvantages of known seat upholstery techniques.

An object of an embodiment of the present invention is to provide the forming of a foam block forming a seat element for different style features.

An object of another embodiment of the present invention is to form such an element with areas having different densities and/or hardnesses.

To achieve all or part of these and other objects, the present invention provides a method for forming upholstery for an element of a motor vehicle seat, wherein:

a foam support block is produced to fit a frame element;

a cover element is created by cold-forming of a foam sprayed onto a polypropylene substrate and attached to the reverse side of a textile material in the form of skin or of a synthetic material, to define the visible shape of the seat element; and the cover element is attached to the support block.

According to an embodiment of the present invention, the cover element is attached to the support block by self-adhesive means.

According to an embodiment of the present invention, the cover element is attached to the support block by clips received in adapted guide strips overmolded in the support block.

According to an embodiment of the present invention, the textile material in the form of skin or of a synthetic material of the cover element at least partially covers the support block.

According to an embodiment of the present invention, the cover element comprises foams having different densities and/or hardnesses.

According to an embodiment of the present invention, the surface of the support block intended to receive the cover element is adapted to a plurality of cover elements having visible surfaces of different shapes.

The present invention also provides upholstery for a motor vehicle seat, comprising:

a foam support block intended to fit a seat frame element; and a cover element defining the shape and the finishing of at least one visible surface of the seat element, said cover element being attached to the support block and being created by cold-forming of a foam sprayed on a polypropylene substrate and attached to the reverse side of a textile material in the form of skin or of a synthetic material.

According to an embodiment of the present invention, said cover element comprises fastening elements intended to engage with corresponding elements supported by the support block.

According to an embodiment of the present invention, the cover element has a non-uniform thickness ranging between 1 and 50 mm.

According to an embodiment of the present invention, the cover element comprises self-adhesive means for fastening to the support block.

According to an embodiment of the present invention, the cover element comprises clips intended to engage with guide strips overmolded in the support block.

According to an embodiment of the present invention, the textile material in the form of skin or of a synthetic material of the cover element at least partially covers the support block.

According to an embodiment of the present invention, the cover element comprises foams having different densities and/or hardnesses.

According to an embodiment of the present invention, the support block comprises a surface adapted to a plurality of cover elements having visible surfaces of different shapes.

The present invention further provides a motor vehicle seat comprising at least such upholstery.

BRIEF DESCRIPTION OF THE DRAWINGS

The foregoing and other objects, features, and advantages of the present invention will be discussed in detail in the following non-limiting description of specific embodiments in connection with the accompanying drawings.

The same elements have been designated with the same reference numerals in the different drawings, which have been drawn out of scale.

DETAILED DESCRIPTION

For clarity, only those steps and elements which are useful to the understanding of the invention have been shown and will be described. In particular, the forming of the other seat elements has not been detailed, the invention being compatible with any usual forming of upholstery attached to a frame.

Figure 1:
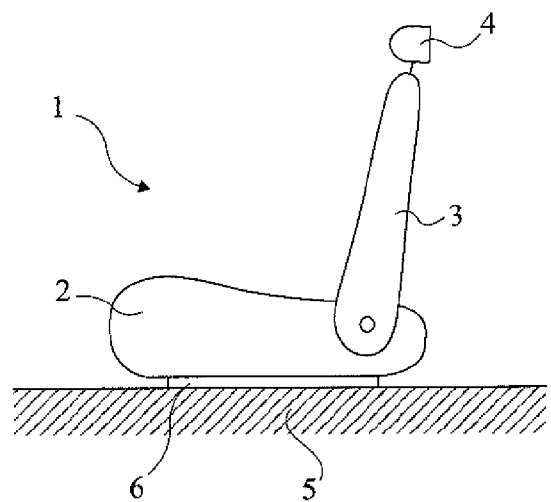
FIG. 1 is a simplified lateral view of a motor vehicle seat.

FIG. 1 is a simplified lateral view of a motor vehicle seat 1. Such a seat comprises a seat bottom piece 2 to which is jointed a backrest 3, most often topped with a headrest 4. Seat bottom piece 2, backrest 3, and headrest 4 each comprise upholstery fastened to their frame, generally made of metal. Frame 6 of seat bottom piece 2 may be connected to floor 5 of the vehicle by a slide rail mechanism. Seat 1 may also comprise one or several armrests (not shown).

Figure 2A:
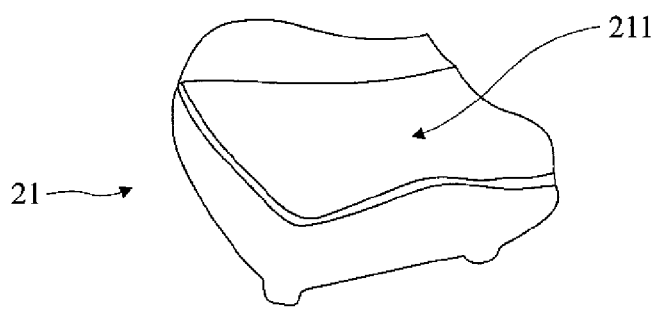
FIGS. 2A, 2B, and 2C are perspective views illustrating an embodiment of upholstery of a seat element.
Figure 2B:
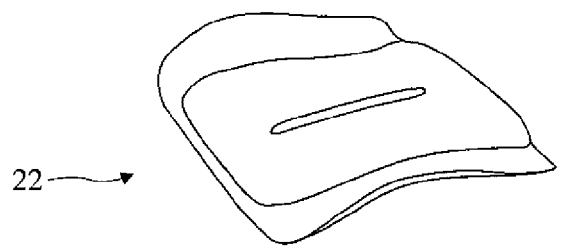
Figure 2C:
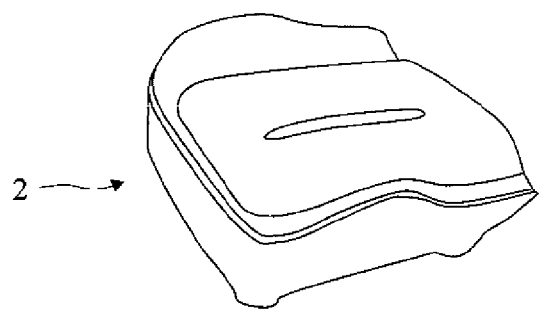

FIGS. 2A, 2B, and 2C are perspective views illustrating the forming of upholstery of a seat element (for example, of seat bottom piece 2).

A support block 21 made of foam (FIG. 2A) is produced with no style feature (with no rib). The difference with usual upholstery lies in its upper surface 211, which does not define the final visible shape.

Support block 21 is intended to receive a textile cover element (woven or not), made of skin or of a synthetic material 22 (FIG. 2B), defining the final shape (style) of the seat element.

Element 22 is intended to be attached (FIG. 2C) to block 21 to obtain the final upholstery of element 2. The fastening of element 22 to block 21 is performed, for example, by self-adhesive bands (not shown), which eases its replacing in case it is worn off or defective. As a variation, element 22 is glued or snapped to block 21. Examples of snap fastening will be described hereafter in relation with FIGS. 4A to 4D.

According to another variation, not shown, lateral 22 edge folds or aprons take part in the maintaining of element 22 on block 21. Such edge folds may be sewn to the edges of element 22 or may be formed by flexible lateral extensions.

In the absence of lateral edge folds, the lateral surfaces of block 21 are for example covered with finishing bands, glued or fastened by any other usual means. The lateral edge folds or the finishing bands are attached to the seat frame by usual means.

An example of the maintaining of the cover element on the support block due to an extension of a textile finishing cover or the like will be discussed hereafter in relation with FIGS. 5A and 5B.

FIGS. 3A, 3B, 3C, 3D, and 3E illustrate an embodiment of a cover element 22 of upholstery of a seat element. These drawings are cross-section views at different steps of the manufacturing of an element 22.

Figure 3A:
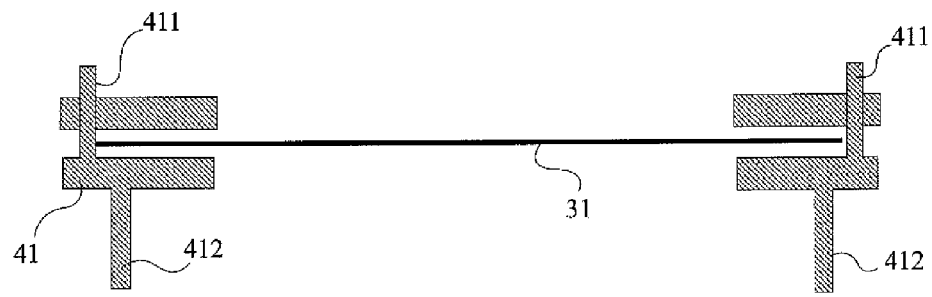
FIGS. 3A, 3B, 3C, 3D, and 3E illustrate an embodiment of a cover element.
Figure 3B:
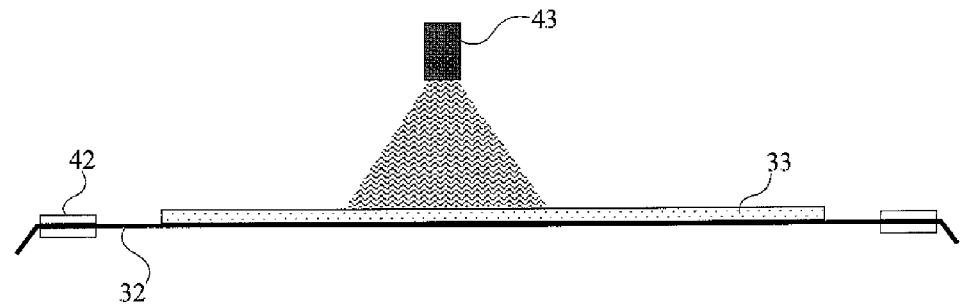

As illustrated in FIG. 3A, a textile piece 31 (made of skin or of synthetic matter), intended to form the visible surface of the cover element, is stretched in a frame 41.

Separately (FIG. 3B), a polyethylene substrate 32 is stretched on a support frame 42 and foam 33 is sprayed by means of a spraying tool 43 onto a surface of substrate 32. A known process of foam spraying on textile pieces (woven or not), made of skin or synthetic material may be used. Substrate 32 is flexible and has a relatively low thickness as compared with the thickness of sprayed foam 33.

Then (FIG. 3C), the substrate coated with foam is attached to piece 31, its foam surface against the textile, in a press 44 having its die 441 and its punch 442 defining the shapes desired for element 22.

The assembly is then submitted to a cold-forming, which comprises applying a pressure (arrow F, FIG. 3D) while foam 33 is in the viscous state.

Frames 41 and 42 cooperate to provide the positioning of the elements with respect to one another in the pressing. For example, frame 42 comprises openings 421 (FIG. 3D) cooperating with posts 411 of frame 41. Similarly, frame 41 comprises elements 412 of alignment with die 441.

Figure 3E:
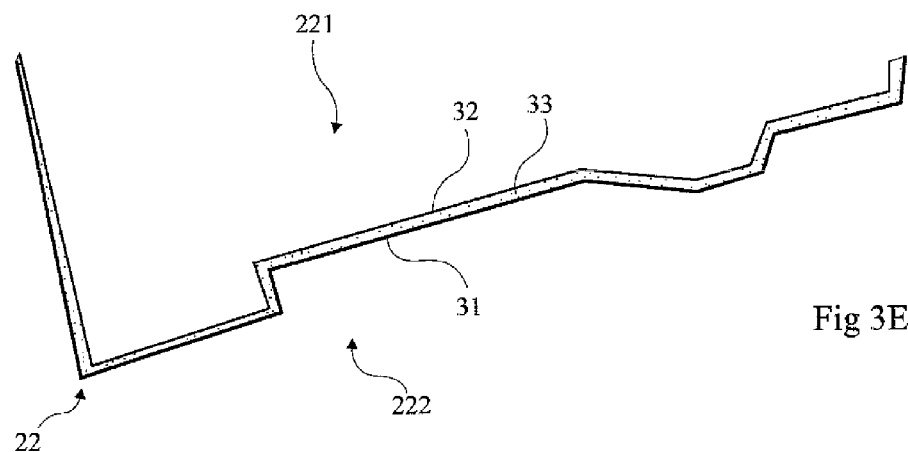
Figure 3C:
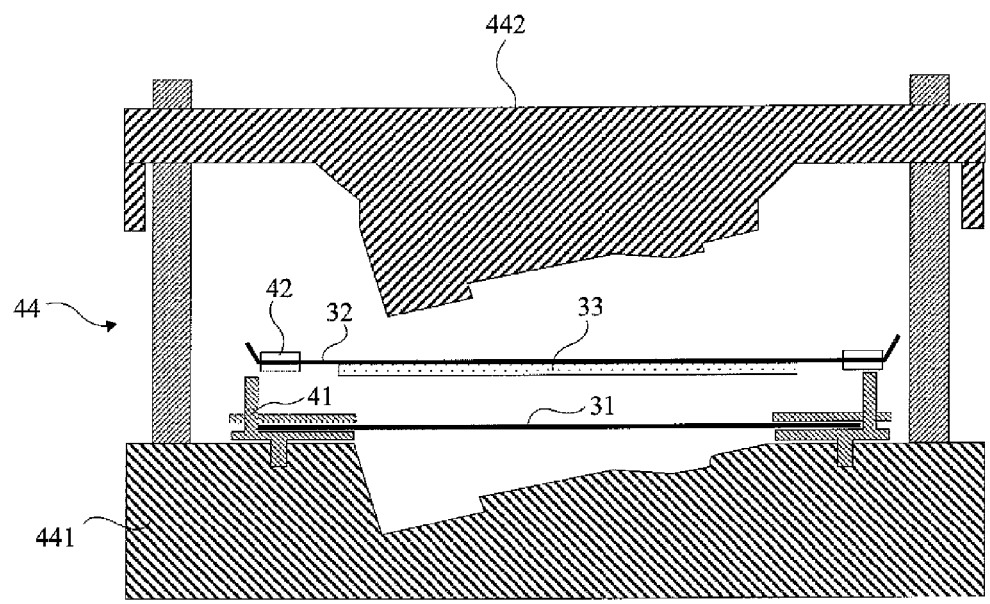
Figure 3D:
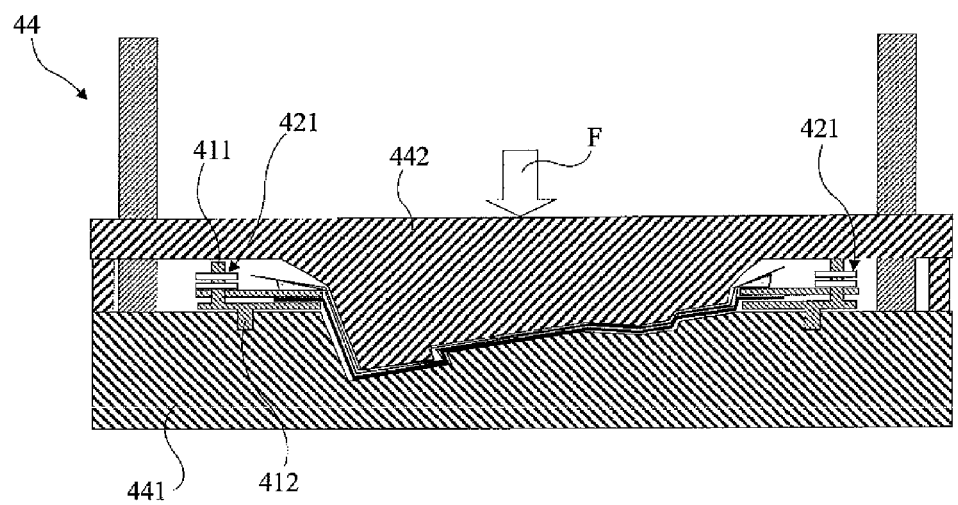

FIG. 3E illustrates the obtained final shape of the cover element. Surface 221, on the side of substrate 32, is a function of visible surface 211 (FIG. 2A) of foam block 21 to fit thereto. It can thus be the same for different types of seat elements. Front (visible) surface 222 of element 22 comprises the style features desired for the seat element.

Cover element 22 for example has a non-necessarily uniform thickness ranging between 1 and 50 millimeters, preferably between 10 and 35 millimeters, to be compared with the few millimeters of textile covers coated with foam. The thickness may further vary according to the areas of the cover element.

Once produced, element 22 is relatively stiff, that is, due to the foam thickness, it keeps the shape given by the press.

The use of a separate cover element 22, arranged on a standard foam block 21, has several advantages.

First, a same support foam block 21 may be used for different families of seats for which different shape and style features are desired.

Further, different foam densities may be provided in the manufactured element. In particular, it is now possible, due to the cover element having a relatively large thickness, to provide the seat element upholstery with different densities according to the parts of this element. This advantage adds to the possibility of producing a foam block of a first hardness and a cover element of a different hardness.

Another advantage is that the preforming of the cover block makes its positioning on the support block easier.

Another advantage is that no modification of support block 21 is required to obtain the final aspect. The cover element thus defines not only the shape of at least one visible surface (typically, the top of the seat bottom piece or the top of the backrest) of the seat element, but also the finishing of at least this visible surface.

Figure 4A:
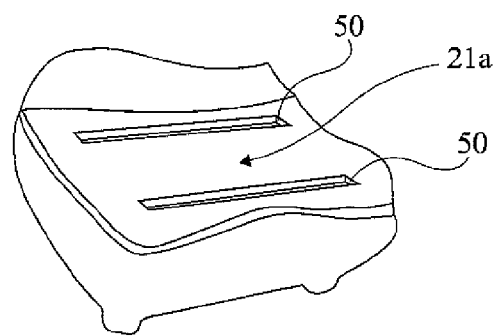
FIGS. 4A to 4D illustrate a way of fastening a cover element.
Figure 4B:
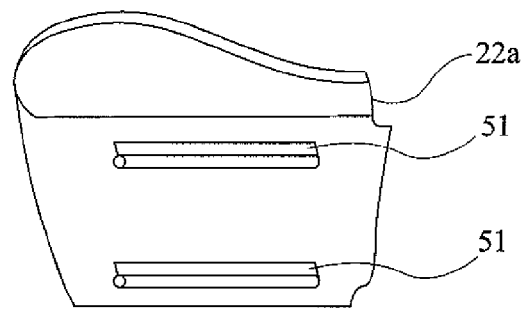
Figure 4C:
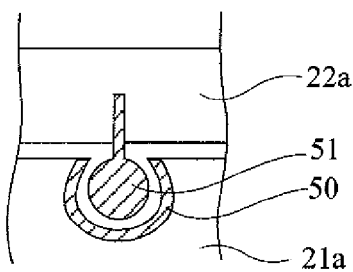
Figure 4D:
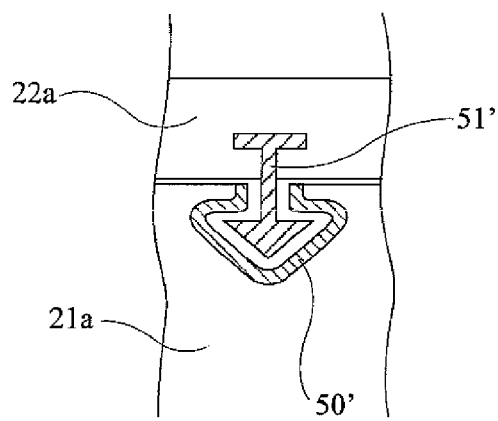

FIGS. 4A to 4D illustrate a way of snapping a cover element 22a to a support block 21a. FIG. 4A is a top view of support block 21a. FIG. 4B is a bottom view of cover element 22a. FIG. 4C is a simplified cross-section view of the clip system. FIG. 4D is a simplified cross-section view of a clip variation.

According to this example, one, or preferentially several hollow plastic guide strips 50 forming a first portion (for example, female) of a clip system are overmolded in support block 21a. The technique of overmolding of a first element of assembly on a foam block is known per se. It is currently used to integrate cover catching lines in the upper surface of a padding by following the style lines. Here, guide strips 50 are arranged at the bottom of a mold for obtaining the foam support block along the desired catching lines (for example, two parallel lines as illustrated in FIG. 4A).

On the side of cover element 22a (FIG. 4B), the corresponding portions (male), for example, bars 51 of the clip system are glued or overmolded at the lower surface (reverse), that is, on the side of foam 33 of cover element 22a.

FIG. 4C is a simplified cross-section view of the clip system illustrating the rounded section of guide strip 50 and the corresponding section of bar 51. In the example of FIGS. 4A to 4C, a continuous clip system is assumed.

FIG. 4D illustrates another example of a system in which local T-moldings 51' are attached (overmolded) to the reverse of cover element 22a and engage with grooves or corresponding local elements 50' of block 22a.

Figure 5A:
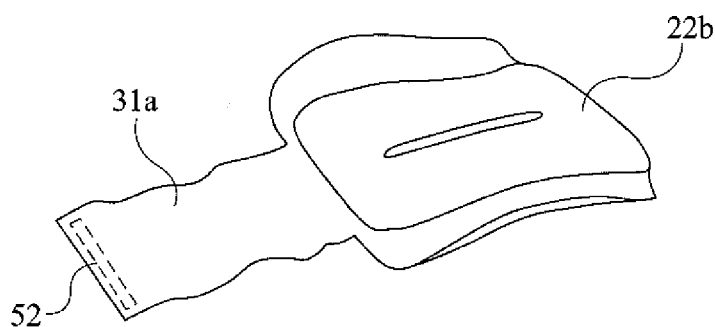
FIGS. 5A and 5B illustrate another way of holding a cover element.
Figure 5B:
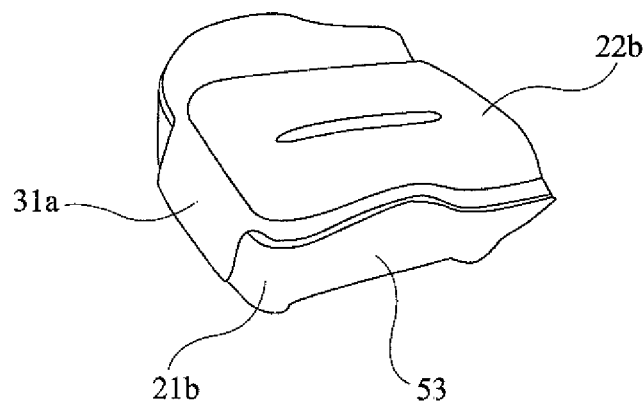

FIGS. 5A and 5B illustrate another mode for maintaining a cover element on a support block. This maintaining mode requires no fastening element on the support block side and uses flexible extensions (without foam) of the cover element to define one or several flaps at least partially covering the support block.

FIG. 5A is a perspective view of cover element 22b. FIG. 5B is a perspective view of support block 21b topped with cover element 22b.

Element 22b is continued towards the front by a portion 31a of the textile, synthetic or skin layer, intended to surround the support block and to be attached to the lower surface thereof, for example, by a band 52 of a self-adhesive system. This embodiment is more specifically intended for the case where edge folds 53 of support block 21b are already coated with a finishing material (for example, textile). According to a variation, not shown, element 22b is continued laterally and towards the front by portions of the textile layer, like a bag. The support block is then engaged into this bag shape, for example, by being sewn at its lower surface.

Embodiments have been described. Various alterations and modifications will occur to those skilled in the art. In particular, although the invention has been described in relation with an example of upholstery for a seat bottom piece, it more generally applies to any seat element. Further, the distribution between the thickness provided to the support foam block and to the cover element may vary according to the seat ranges. Further, the practical implementation of the invention is within the abilities of those skilled in the art based on the functional indications given hereabove. In particular, the selection of the foams adapted to the cold-forming essentially depends on the desired density and hardness. Finally, the created upholstery may or may not have an apron.

The invention claimed is:

1. A method for forming upholstery for an element of a motor vehicle seat, the method comprising:

producing a foam support block configured to fit a frame element;

spraying foam on a polypropylene substrate to form a coated substrate;

attaching the coated substrate to a reverse side of a textile material in a press comprising a die and punch to provide a cover element, wherein the textile material is in the form of skin or of a synthetic material, and wherein the press imparts in the cover element a visible shape of the element; and attaching the cover element is to the support block external to the press.

2. The method of claim 1, wherein the cover element is attached to the support block by self-adhesive bands.

3. The method of claim 1, wherein the cover element is attached to the support block by clips received in adapted guide strips overmolded in the support block.

4. The method of claim 1, wherein the textile material in the form of skin or of a synthetic material of the cover element at least partially covers the support block.

5. The method of claim 1, wherein the cover element comprises foams having different densities and/or hardnesses.

6. The method of claim 1, wherein attaching the coated substrate to the textile material in the press further comprises applying the press a while the foam is in a viscous state.

* * * * *